(No Model.)

F. W. FRAMPTON.
SELF SETTING TRAP.

No. 596,990. Patented Jan. 11, 1898.

Witnesses:
L. C. Mills
A. L. Hough

Inventor
Franklin W. Frampton,
by Franklin H. Hough
Attorney

UNITED STATES PATENT OFFICE.

FRANKLIN W. FRAMPTON, OF LEXINGTON, NEBRASKA.

SELF-SETTING TRAP.

SPECIFICATION forming part of Letters Patent No. 596,990, dated January 11, 1898.

Application filed October 22, 1897. Serial No. 656,046. (No model.)

*To all whom it may concern:*

Be it known that I, FRANKLIN W. FRAMPTON, a citizen of the United States, residing at Lexington, in the county of Dawson and State of Nebraska, have invented certain new and useful Improvements in Self-Setting Traps; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in traps, and especially to a self-set and ever-set trap adapted for use in catching rats or other small animals.

The invention relates, further, to the provision of a compartment which has pivoted within the same, near its upper end, a tilting trap which allows the animal after being decoyed onto the said trap in quest of bait to fall into the compartment, which compartment is provided with an exit regulated by a slide which is held in the compartment and over the exit by means of a curved rod, against which the notched end of the slide guarding the exit engages, a portion of the said rod being downwardly bent and engaging with the upper face of the slide to hold it securely against a lateral or vertical movement.

To these ends and to such others as the invention may pertain the same consists, further in the novel construction, combination, and adaptation of parts, as will be hereinafter more fully described and then specifically defined in the appended claim.

The invention is clearly illustrated in the accompanying drawings, which, with the letters of reference marked thereon, form a part of this specification, and in which drawings—

Figure 1:
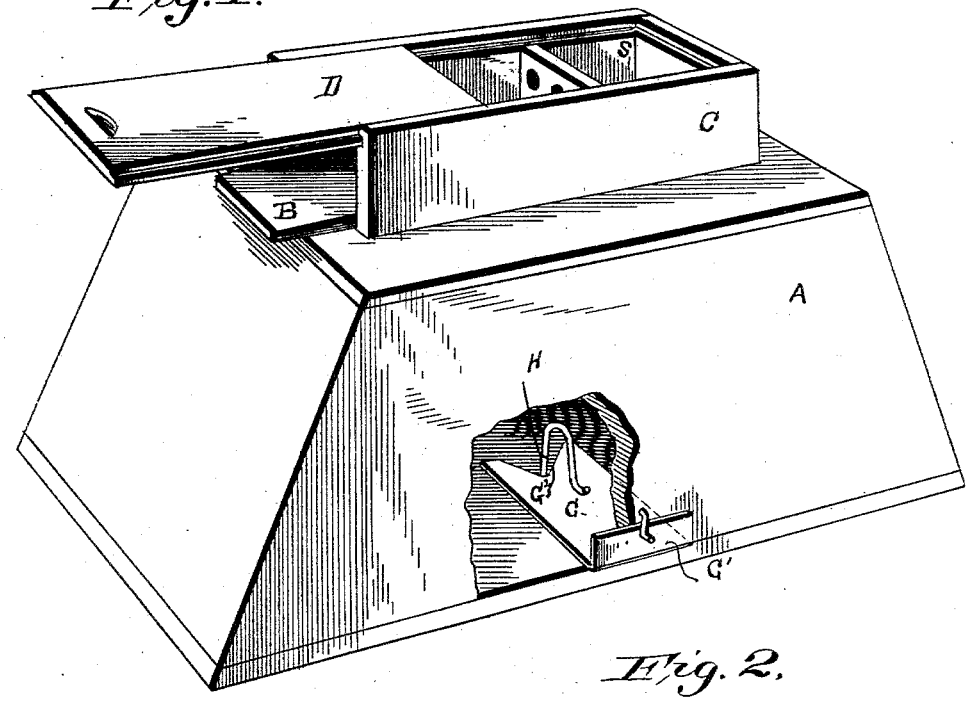
Figure 2:
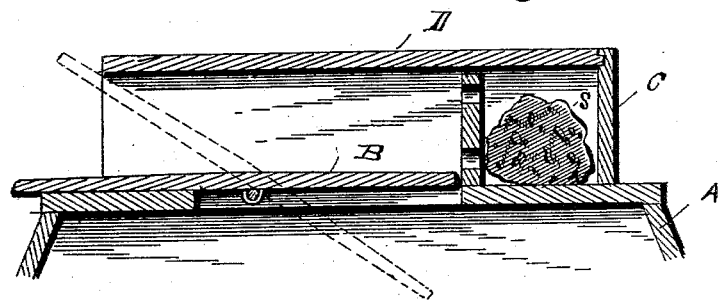
Figure 3:
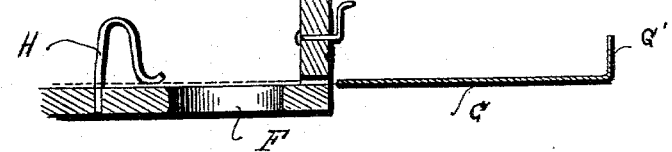

Figure 1 represents a compartment, showing the tilting platform and the means for retaining the slide which guards the exit in the compartment. Fig. 2 is an enlarged view of the slide guarding the exit from the compartment and the means for locking the same against a lateral or upward movement.

Reference now being had to the details of the drawings by letter, A designates the box of the trap, which is closed on all sides excepting its upper end, and to the side walls of the box is pivoted the tilting platform B. Mounted about the said tilting platform is the inclosure C, which has a sliding top D, and into the open end of which compartment the animal is enticed or decoyed, being attracted by the bait which it scents, which bait is contained within an inner compartment having a wall, which is perforated, between the same and the compartment which has for its bottom the tilting platform, and as the animal comes forward beyond the pivotal point of the platform it tilts and drops the animal into the box of the trap. The said tilting platform is so arranged on its pivot that it will automatically close back into a horizontal position after being tilted.

In the bottom of the box of the trap is an exit-aperture F, and a slide G passes through one of the side walls of the box and has its end downwardly turned at an angle, as at G'. This bent end is for convenience in drawing the slide out when it is desired to uncover the aperture or exit in the bottom of the box. The inner end of this slide has a notch $G^2$, and H is a retaining-rod, which is bent in the shape shown and is mounted in the bottom wall of the box-trap, while the bent portion of the same extends down nearly to the bottom of the box and is designed to bear against the upper surface of the slide and hold the same against any upward movement, while the notched end of the slide engages against the shank of the wire and prevents any lateral movement of the same, thus insuring the slide against being opened in any way by the animals within the traps.

Having thus described my invention, what I desire to secure by Letters Patent is—

In a self-setting trap, the combination with the box, having a tilting platform and closed compartment for containing the bait, with a perforated wall between the same and the compartment which has for its bottom, the tilting platform, the slide G, which has its inner end notched, its outer end bent at an angle, and the retaining-rod having the downwardly-bent portion adapted to bear against the upper face of the said slide, and the notch of the said slide to bear against the shank of said rod, whereby the slide is prevented from moving laterally or vertically, all substantially as and for the purpose set forth.

In testimony whereof I affix my signature in presence of two witnesses.

FRANKLIN W. FRAMPTON.

Witnesses:
JOHN C. BROOKS,
ANDREW JACKSON WHITE.